United States Patent
Grebenkämper et al.

(10) Patent No.: US 10,757,954 B2
(45) Date of Patent: Sep. 1, 2020

(54) PROCESS FOR PREPARING A FAT SLURRY AND FOR PREPARING A SPREAD WITH SAID SLURRY

(71) Applicant: UPFIELD US INC., Englewood Cliffs, NJ (US)

(72) Inventors: Kai Grebenkämper, Vlaardingen (NL); Cornelis Johannes Kroon, Pijnacker (NL); Abraham Leenhouts, Vlaardingen (NL); Rogier Antoine Floris The, Delft (NL)

(73) Assignee: UPFIELD EUROPE B.V., Rotterdam (NL)

( * ) Notice: Subject to any disclaimer, the term of this patent is extended or adjusted under 35 U.S.C. 154(b) by 465 days.

(21) Appl. No.: 15/517,396

(22) PCT Filed: Sep. 18, 2015

(86) PCT No.: PCT/EP2015/071483
§ 371 (c)(1),
(2) Date: Apr. 6, 2017

(87) PCT Pub. No.: WO2016/058782
PCT Pub. Date: Apr. 21, 2016

(65) Prior Publication Data
US 2017/0251689 A1    Sep. 7, 2017

(30) Foreign Application Priority Data
Oct. 13, 2014   (EP) .................................. 14188659

(51) Int. Cl.
*A23D 9/05* (2006.01)
*A23D 9/02* (2006.01)
*A23D 7/00* (2006.01)
*A23D 7/02* (2006.01)
*A23L 27/60* (2016.01)
(Continued)

(52) U.S. Cl.
CPC ................. *A23D 9/05* (2013.01); *A21D 2/16* (2013.01); *A23D 7/001* (2013.01); *A23D 7/02* (2013.01); *A23D 9/007* (2013.01); *A23D 9/02* (2013.01); *A23L 9/24* (2016.08); *A23L 27/60* (2016.08);
(Continued)

(58) Field of Classification Search
CPC . A23D 9/05; A23D 2/16; A23D 7/001; A23D 7/02; A23D 9/007; A23D 9/02; A23L 9/24; A23L 27/60; A23L 33/115; C11B 15/00
See application file for complete search history.

(56) References Cited

U.S. PATENT DOCUMENTS

| 2011/0287160 A1 | 11/2011 | Dobenesque et al. |
| 2013/0192278 A1 | 8/2013 | Arends et al. |

FOREIGN PATENT DOCUMENTS

| EP | 1651338 | 5/2006 |
| EP | 1865786 | 11/2011 |

OTHER PUBLICATIONS

E. Weidner, Powderous Composites by High Pressure Spray Processes, Article Contribution to a Conference in Versailles, 1993, pp. 1-13, DE.

(Continued)

*Primary Examiner* — Katherine D Leblanc
(74) *Attorney, Agent, or Firm* — Arent Fox LLP

(57) ABSTRACT

A process for preparing a slurry of edible oil and fat powder, and to a process of preparing an edible fat-continuous spread out of such. The process for preparing said slurry has at least two different regimes of reduced pressure.

15 Claims, 1 Drawing Sheet

(51) Int. Cl.

| | |
|---|---|
| *A23L 9/20* | (2016.01) |
| *A23L 33/115* | (2016.01) |
| *A21D 2/16* | (2006.01) |
| *A23D 9/007* | (2006.01) |
| *C11B 15/00* | (2006.01) |

(52) U.S. Cl.
CPC ............ *A23L 33/115* (2016.08); *C11B 15/00* (2013.01); *A23V 2002/00* (2013.01)

(56) References Cited

OTHER PUBLICATIONS

Experimental and Analytical Facilities, Delft University of Technology, Dec. 16, 2005, pp. 41-51.
IPRP2 in PCTEP2015071483, dated Aug. 26, 2016.
Margarines and Shortenings, Ullmanns Encyclopedia of Industrial Chemistry, 1990, pp. 156-158, vol. A16.
P. Munuklu et al., Particle formation of edible fats using the supercritical melt micronization process (ScMM), The Journal of Supercritical Fluids, 2007, pp. 181-190, vol. 43, Elsevier.
Search Report in EP14188659, dated Nov. 14, 2014.
Search Report in PCTEP2015071483, dated Nov. 26, 2015.
T. Wagner, Resultate, PhD Thesis at ETH Zurich, 1997, Total pp. 226; cited pp. 100-105 and 199-200—no translation available.
Written Opinion in EP14188659, dated Nov. 14, 2014.
Written Opinion in PCTEP2015071483, dated Nov. 26, 2015.

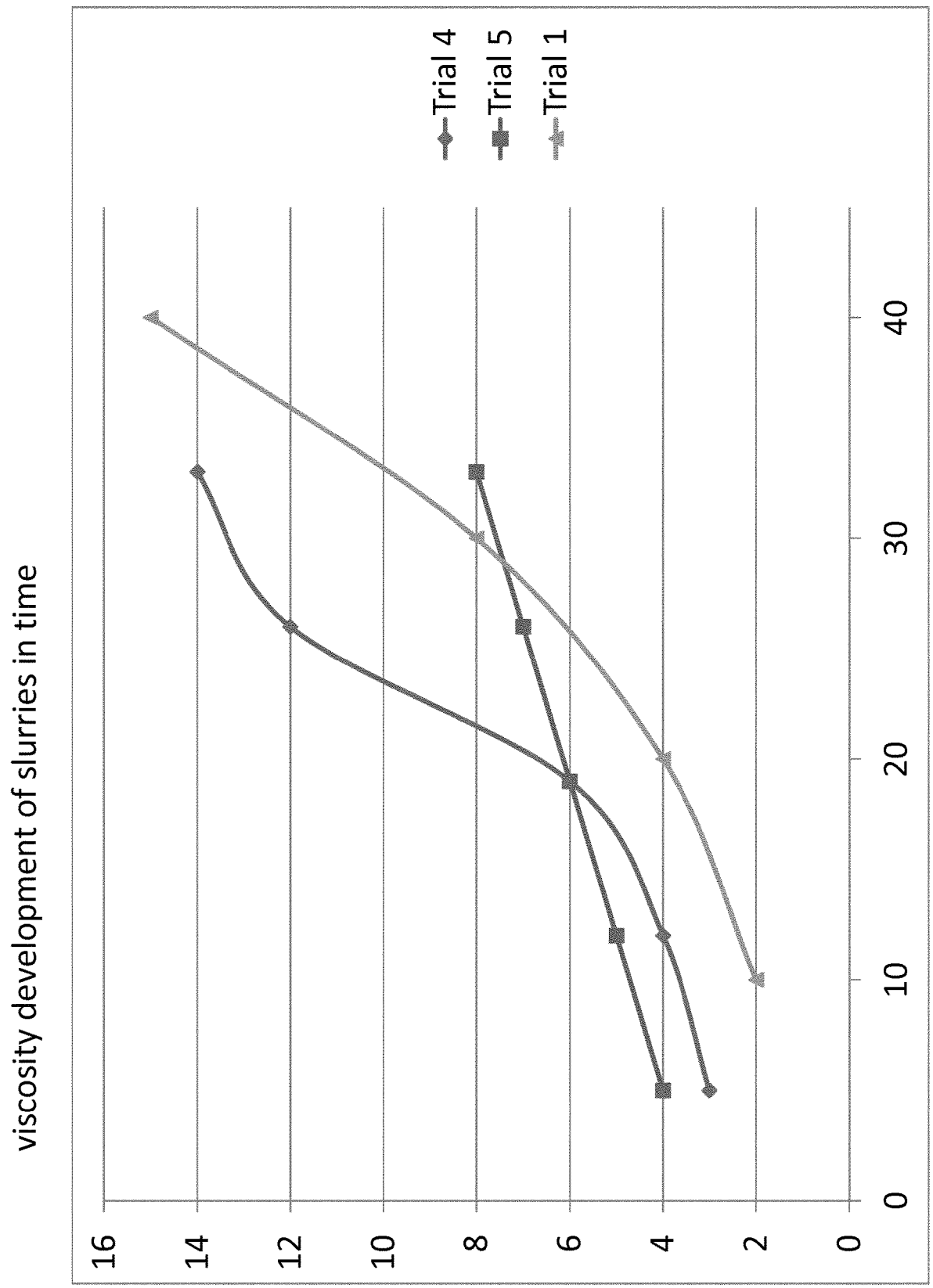

PROCESS FOR PREPARING A FAT SLURRY AND FOR PREPARING A SPREAD WITH SAID SLURRY

FIELD OF THE INVENTION

The present invention relates to a process for preparing a slurry of edible oil and fat powder, and to a process of preparing an edible fat-continuous spread out of such.

BACKGROUND OF THE INVENTION

Fat continuous food products are well known in the art and include for example shortenings comprising a fat phase and water in oil spreads like margarine comprising a fat phase and an aqueous phase.

The fat phase of margarine and similar edible fat continuous spreads is often a mixture of liquid oil (i.e. fat that is liquid at ambient temperature) and fat which is solid at ambient temperatures. The solid fat, also called structuring fat or hardstock fat, serves to structure the fat phase (being the case in for example a shortening as well as in a water in oil emulsion) and helps to stabilize the aqueous phase, if present, by forming a fat crystal network. For a margarine or spread, ideally the structuring fat has such properties that it melts or dissolves at mouth temperature. Otherwise the product may have a heavy and/or waxy mouthfeel.

Important aspects of a fat continuous spread like for example margarine and low fat spread, the low fat spread usually comprising up to 45 wt % fat on total composition, are for example hardness, spreadability and ability to withstand temperature cycling.

Temperature cycling means that the product is subjected to low and high temperatures (e.g. when the consumer takes the product out of the refrigerator and leaves it for some time at the table prior to use). This may have a negative influence on the structure of the spread (like for example destabilization of the emulsion or oil-exudation).

Generally edible fat continuous food products like shortenings and margarines and similar edible fat continuous spreads are prepared according to prior art processes that encompass the following steps:
1. Mixing of the liquid oil, the structuring fat and if present the aqueous phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

A disadvantage of these processes is that the complete composition (including the liquid oil, structuring fat and if present the aqueous phase) is subjected to a heating step and a cooling step. This requires a lot of energy. For a spread comprising for example 6 wt % structuring fat the whole composition (100 wt %) has to be heated and cooled.

Another disadvantage of the known processes is that the choice of fats that can practically be used as structuring agent is rather limited. If the melting point of the structuring agent is too high the melting properties in the mouth are unsatisfactory. If on the other hand, the melting point is too low, the emulsion stability will be negatively affected. Moreover the amount of saturated fatty acids.

(SAFA) in the structuring agent is usually relatively high. Also trans fatty acid may be present. Some experts have called for reductions in these fatty acids to improve cardiovascular health.

Some consumers prefer spreads that have a low energy density (for example products that are low in total fat) and/or are low in SAFA but still have a good nutritional profile (by providing for example essential fatty acids like omega-3 and omega-6).

A further disadvantage of the known processes is that the product or ingredients may deteriorate due to the changes in temperature caused by the heating and cooling step.

Alternative processes have been described wherein the structuring fat is added as fat powder (i.e. crystallized fat) thereby eliminating the need to heat the whole composition to above the melting temperature of the structuring fat.

EP 1865786 A discloses a process for the preparation of a spreadable edible dispersion wherein a mixture of oil and solid structuring agent particles is subjected to stirring and an aqueous phase is gradually added to the mixture until a dispersion is obtained. The solid structuring agent particles have a microporous structure of submicron size particles and can be prepared using a micronisation process. The solid structuring agent particles (i.e. can be seen as fat powder) in such process need to be mixed with oil. Such can be achieved in various ways. Mixing powders of low bulk density (i.e. very fluffy powders) with a liquid, e.g. edible oil, can pose some difficulties.

When fat powder of structuring fat (e.g. of the kind as set out in the previous paragraph) needs to be mixed with liquid oil, e.g. in a ratio such that the oil/fat powder mixture contains about 2-40% (by weight) fat powder on the oil/fat powder combination, it was found to be advantageous to reduce the pressure to partial vacuum (e.g. 0.2 bar or lower) in the mixing vessel containing the powder, prior to or during the addition of oil and/or during the mixing thereof. The pressure is then raised to atmospheric pressure during or after the mixing. If such mixing is conducted well and the temperature of the oil is kept below the melting point of the structuring fat, the resulting product is a slurry of oil containing crystallized fat particles of the structuring fat.

Said slurry has a higher viscosity than the oil before it was mixed with the fat powder. In fact, during mixing the viscosity increases, as the fat powder is finely dispersed in the oil. Hence, viscosity builds as the fat powder is dispersed. It was found that when such slurry is to be mixed with an aqueous phase to produce a water in oil emulsion, slurries that perform well in the resulting emulsion (stability, firmness), should have a certain minimum viscosity. The process of making such slurry can take e.g. from 2 to 60 minutes. Clearly, it is desired that the required mixing time is as short as possible. Mixing (of oil and fat powder) time can depend on e.g. the type of equipment, the amount of powder over the oil, the type of oil and the type of fat used for the fat powder.

Still, despite the lowering of the pressure in the vessel in which the fat powder is contacted with the oil, in case the fat powder is a microporous fat powder as is e.g. described in J. of Supercritical Fluids 43 (2007) 181-190 and EP1651338 the mixing can cause difficulties.

Therefore, there is a need for an improved mixing process of mixing liquid oil with a microporous fat powder, in which viscosity builds sufficiently fast, or in other words: that mixing to yield a desired viscosity is achieved in a reduced amount of time.

US 2011/0287160 discloses a process for the preparation of low fat spreads comprising an emulsifier. The low fat spreads are made by mixing fat powder and oil, followed by mixing with an aqueous phase. At least part of the emulsifier is added through the aqueous phase.

US 2013/0192278 discloses a process for making fat powder by spray crystallization (or cryogenic spray process) for structuring oil-containing dispersions.

SUMMARY OF THE INVENTION

Hence, it is an object of the present invention to provide a process for mixing liquid oil with a microporous fat powder, in which mixing time is reduced. Preferably, such is achieved in such a way that a certain minimum viscosity builds, as such can be an indication of good mixing of these systems.

It has now been found that the above objectives can be met, at least partially, by a process for preparing an edible fat slurry comprising 70-98% by weight (on the total slurry of oil and fat powder) of an edible oil and 2-30% by weight (on the total slurry of oil and fat powder) of fat powder, wherein the fat powder is a micronised fat powder of a structuring fat, said process comprising the steps of:
a) providing the fat powder;
b) providing the oil;
c) combining the fat powder and the oil in a mixing vessel;
d) mixing the oil and fat powder in the mixing vessel to a fat slurry for a period of 1 to 8 minutes at a pressure of below 0.25 bar,
e)<subjecting the mixing vessel to a pressurising step of 30 seconds to 6 minutes to raise the pressure in the mixing vessel to at least 0.3 bar, during which the shear in the mixing vessel is less than the shear in step g),
f) subjecting the mixing vessel to a de-pressurising step of 1 to 10 minutes to reduce the pressure in the mixing vessel to below 0.25 bar,
g) subjecting the content of the mixing vessel to a stirring operation for 3 to 10 minutes,
wherein the temperature of the fat powder, oil phase, and mixture thereof is kept at a temperature of below 35° C.

Preferably at step c) first the fat powder is added to the mixing vessel, followed by reducing the pressure to below 0.25 bar, and subsequently the oil is added.

At step e) the pressure is raised to at least 0.3 bar, such as to atmospheric pressure. However to further speed up the process preferably at step e) the pressure is raised in the mixing vessel from 0.3 to 0.7 bar. More preferably, said pressure is raised to at least 0.4 bar, even more preferably to at least 0.45 bar, and even more preferably from 0.4 to 0.7 bar, and most preferably from 0.45 to 0.7 bar.

As the edible fat slurry so-prepared can be used well in a process of making an edible emulsion, preferably a spreadable emulsion, by mixing such with an aqueous phase, the invention further relates to a process for making an edible oil-continuous emulsion containing 15-80% (by weight on the total emulsion) of a fat phase and 20-85% (by weight on the total emulsion) of an aqueous phase, which process comprises the steps of
providing the aqueous phase at a temperature below 35° C.,
providing a fat slurry of oil and fat powder,
mixing said aqueous phase and said fat slurry to obtain an oil-continuous emulsion,
wherein said fat slurry is obtained by the process comprising the steps according to this invention.

BRIEF DESCRIPTION OF THE FIGURES

FIG. 1: Graphical representation of the development of slurry (vegetable oil with fat powder) viscosity in time during mixing in Trial 1, 4 or 5.

DETAILED DESCRIPTION OF THE INVENTION

When powders such as fat powders, especially fat powders with a very low bulk density (examples are micronized fat powders) are to be mixed with oil, e.g. at concentrations of 1-10 weight % powders on 90% oil, this is preferably achieved at a reduced pressure. A reduced pressure makes that wetting is quicker and also any potential remainder of the gas used in production of the fat particles (entrapped in the small cavities) that could prevent complete mixing with oil is thus removed.

Still, there was room for improvement. Depending e.g. on the type of oil, the type of the fat powder, the amount, the type of mixer, even shorter times of mixing may be desired. In the process according to the invention it was shown that by introducing a stage in which there is less deep vacuum (i.e. or no vacuum) and less shear, better results can be obtained. The improvement is seen in faster build up of the desired viscosity.

It will be clear that when going from e.g. a pressure of about 0.25 bar to a pressure of about 0.6 bar, this costs time. In the claimed process, the indicated times are the time intervals at which the pressure is within the claimed range. Still, mixing may continue or may be discontinued in the process of going from e.g. 0.2 bar to 0.6 bar. What matters is that for a time interval as mentioned, the pressure is within the claimed level. The pressure can be increased, such as by opening a valve to let air or nitrogen in, or decreased, such as by use of a vacuum pump.

In the process according to the invention, it may be preferred that steps f) and g) are carried out at least partially simultaneously. In other words, during the reduction of the pressure there may be stirring, stirring may also start later when the desired low pressure is achieved.

The cycle of less deep vacuum with low shear (step e in the process as set out above) followed by deeper vacuum pressure/high shear (steps f and g) may be repeated for 1-10 times, preferably 2 to 6 times. Hence, it is preferred that in the process according to the invention, the successive steps e) to g) are repeated at least once. Preferably, they are repeated 2 to 6 times. As the cycling of deep vacuum and high shear followed by less deep vacuum and less shear, optionally to be repeated for 1-10 times, preferably 2 to 6 times are to act on the micronized fat powder, and as it is desired to reach the desired high end viscosity as quickly as possible, it is preferred that all of the micronized fat powder is included in the mixing vessel in step c.

For a process in which microporous fat particles are mixed with oil, at which microporous particles are broken down into smaller particles, the viscosity of the oil/particle slurry will increase. For these fat slurries, the viscosity increase is desired, and a minimum viscosity can be the target. Higher viscosity relates to more intense mixing, and following this, in the present invention, it is preferred that the successive steps e) to g) are repeated until the viscosity of the content in the mixing vessel has reached a viscosity of at least 5 dPa·s, preferably at least 8 dPa·s, more preferably at least 10 dPa·s.

In the present process, some steps are carried out at a low pressure, below 0.25 bar. However, it may be preferred that the pressure in steps d) and f) is reduced to below 0.2 bar, preferably to below 0.15 bar, more preferably to below 0.1 bar.

Depending on e.g. the amount of fat powder and the mixing equipment the various steps may be carried out longer or shorter. In the present invention, it is preferred that the de-pressurising step f) and the mixing step g) are effected in a total time of 2 to 10 minutes, preferably in a total time of 3 to 8 minutes.

When it is concluded mixing is finished, e.g. as can be determined when a certain viscosity is reached, the resulting oil slurry may be removed from the mixing vessel. Prior to doing so, it may be practical to raise the pressure to atmospheric, e.g. by opening a valve connected to the environment. Hence, it may be preferred that after step g) the pressure is brought up to atmospheric pressure.

As mentioned, mixing is to be carried out of the fat powder and the oil. This may be carried out by any suitable means. Preferably, the oil and the fat powder are mixed by one or more of (a) recirculation means, (b) a dynamic mixer, and (c) a stirrer in the mixing vessel. When the mixing vessel contains a recirculation means as part of the mixing equipment, such will usually contain a pump, but it may also be preferred that the recirculation means (recirculation loop or tube) comprises mixing means, preferably an in-line mixer, preferably a dynamic in-line mixer. In case of a recirculation means being present, the stirring time in the mixing vessel can suitably be adapted to the average residence time of the content in the mixing vessel, e.g. so that on average at least the whole content has (on average) gone through the recycle loop at least once. Hence, it may be preferred that the stirring operation in step g) is carried out for at least the time equal to the average residence time of the vessel with recirculation means.

It will be clear that the fat powder is mixed with the oil to achieve that a slurry is obtained. This slurry can only exist if the temperature of the mixture oil+fat powder is kept below the melting point of the fat powder. In most cases fat powders will be used that melt at in the mouth conditions. Therefore the temperature of the fat powder, oil phase, and mixture thereof is kept at a temperature of below 35° C.

The process of making the slurry of oil and fat powder may be carried out with any desired amount of fat powder, although it will be clear there is an upper limit above which viscosities will get too high for easy processing, and a lower limit below which there is little effect of the fat powder in the oil. Hence, it is preferred in the present invention that the amount fat powder on the total fat slurry is from 2 to 20% (preferably from 3 to 12%) by weight, based on the total fat slurry.

The fat powder can be made by any suitable process for making fat powder. Suitable methods to prepare the fat powder include for example cryo-crystallization, in which atomized liquid droplets come in contact with liquid nitrogen causing the droplets to instantaneously solidify, and Super Critical Melt Micronisation (ScMM), also known as particles from gas saturated solutions (PGSS). ScMM is a commonly known method and is for example described in J. of Supercritical Fluids 43 (2007) 181-190 and EP1651338.

The fat powder comprises hardstock fat and preferably comprises at least 80 wt. % of hardstock fat, more preferably at least 85 wt. %, even more preferably at least 90 wt. %, even more preferably at least 95 wt. % and even more preferably at least 98 wt. %. Still even more preferably the edible fat powder essentially consists of hardstock fat. The hardstock fat as present in the edible fat powder has a solid fat content N10 from 50 to 100, N20 from 26 to 95 and N35 from 2 to 60.

The process is preferably carried out as a batch process.

EXAMPLES

Water Droplet Size Distribution of W/O Emulsions

The normal terminology for Nuclear Magnetic Resonance (NMR) is used throughout this method. On the basis of this method the parameters D3,3 and exp($\sigma$) of a lognormal water droplet size distribution can be determined. The D3,3 is the volume weighted mean droplet diameter and $\sigma$ (e-sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the lognormal droplet size distribution—the parameters of the water droplet size distribution D3,3 (volume weighed geometric mean diameter) and $\sigma$ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

Stevens Value

Stevens values indicates a products hardness or firmness. The Stevens value was measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

Viscosity Measurement

The viscosity was determined with a Haake viscotester 2 plus with R1 spindle (Rotor No. 1). The flow resistance of the dispersion (i.e. of the fat powder and oil slurry) is displayed while the spindle rotates at 62.5 rpm. The spindle was inserted in the dispersion so that the fluid level reached the immersion groove on the shaft of the spindle. Next, the spindle was attached to the viscometer. The viscosity was measured of the dispersion phase having a temperature of 20-24 degrees Celsius by setting the Haake viscosimeter 2 to program R1. The viscosity was measured in dPa·s.

Example 1

The composition of the fat phase used in Example 1: Trials 1, 4 and 5:

| Fat phase | % on fat phase | % on spread product (45% fat emulsion) |
|---|---|---|
| [1]Micronized fat powder | 10 | 4.5 |
| vegetable oil blend | 89.56 | 40.3 |
| [2]lecithin | 0.44 | 0.2 |

[1]The micronized fat powder was obtained using a supercritical melt micronisation process similar to the process described in Particle formation of ductile materials using the PGSS technology with supercritical carbon dioxide, P. Münüklü, Ph. D. Thesis, Delft University of Technology, 16 Dec. 2005, Chapter 4, pp. 41-51. The fat powder consisted of an interesterified mixture of 65% dry fractionated palm oil stearin with an Iodine Value of 14 and 35% palm kernel oil.
[2]Soybean lecithin In the trails, either one (Trial 1) or two (Trial 4 and 5) shear regimes were used:
  high: (960 rpm of the high shear mixer, 3000 rpm for the in-line dynamic mixer and 12 rpm for the agitator) used in-line in trial 1 and in the 5 minute-periods in trials 4, 5; and
  low (or reduced): (480 rpm of the high shear mixer, 0 rpm for the in-line dynamic mixer and 12 rpm for the agitator) at the 2-minute-periods in trials 4 and 5.

The temperature during the trials as described below were kept below the melting point of the hardstock comprised by the micronized fat powder.

Trial 1:
After combining the oil, lecithin and the powder in a stainless steel tank, the vacuum was maintained at 0.1 bar, and the mixture continuously mixed. Mixing took place by use of a stainless steel vessel (DU BG-type Zoatec), suitable to subject to vacuum and fitted with an agitator (12 rpm) and a high shear mixer (operated at 960 rpm) in the vessel. The vessel was further equipped with a re-circulation loop fitted with a circulation pump and an in-line dynamic mixer (operated at 3000 rpm).

Trial 4: contained the following sequence:
After combining the oil, lecithin and the powder, the mixture was 5 minutes stirred at 0.1 bar (first 5 minute period). Mixing also took place by use of a stainless steel vessel as described for Trail 1. The mixing speed in this first period was: agitator (12 rpm), high shear mixer (960 rpm), circulation pump on and in-line dynamic mixer (3000 rpm).
then a valve on the vessel was opened for a short while to raise the pressure to 0.5-0.7 bar. The valve was closed, and stirring was continued at this pressure for in total 2 minutes after opening the valve. During this 2 minute-period, stirring was reduced of the in-line dynamic mixer (first 2 minute period)
After this 2-minute period the pressure was lowered again by pumping out gas until a pressure of 0.1 bar was achieved. Stirring was continued for in total 5 minutes after starting to lower the pressure, and stirring was back at the level of the first 5 minutes. (second 5 minute period)
Thereafter there was the same 2 minute period in which lower shear and a higher pressure were present like the first 2-minute period (second 2 minute period)
Thereafter there was the same 5 minute period in which higher shear and a lower pressure were present like the second 5-minute period (third 5 minute period)
Thereafter there was the same 2 minute period in which lower shear and a higher pressure were present like the first 2-minute period (third 2 minute period)
Thereafter there was the same 5 minute period in which higher shear and a lower pressure were present like the second 5-minute period (fourth 5 minute period)

Trial 5:
Is a repetition of trial 4 regarding different mixer speeds (i.e. different shear regimes), but the pressure was maintained as in Trail 1 at 0.1 bar throughout the mixing.

Hence, Trial 4 had the vacuum break method according to the invention, Trial 1 is a control by not manipulating the pressure (or shear), and Trial 5 is a control by only manipulating the shear, not the pressure.

Of each trial, the viscosity of the slurry in the mixing vessel was measured. Results are set out in table 1 below.

TABLE 1 dispersion development as measured by viscosity (xminutes from start of the trial)

| Trail 1 Time from start(mins) | Viscosity (dPa · s) | Trail 4 Time from start(mins) | Viscosity (dPa · s) | Trail 5 Time from start(mins) | Viscosity (dPa · s) |
|---|---|---|---|---|---|
|  |  | 5 | 3 | 5 | 4 |
| 10 | 2 | 12 | 4 | 12 | 5 |
| 20 | 4 | 19 | 6 | 19 | 6 |
|  |  | 26 | 12 | 26 | 7 |
| 30 | 8 | 33 | 14 | 33 | 8 |
| 40 | 15 |  |  |  |  |

CONCLUSION

In table with the results and FIG. 1 it can clearly be seen that the 5-2 Sequence method (i.e. according to Trial 4 and according to the invention) had a positive influence on the viscosity development of the dispersion. By comparing with the trials in which the vacuum was not released, the effect of the vacuum release is clear. When the vacuum is not released the viscosity development is much less than with vacuum release. Also many white particles remain visible. With the 5-2 Sequence method at 33 minutes much less white particles were visible in the dispersion. With light microscopy and polarized light a very smooth dispersion with small crystals could be observed.

Example 2

In a serie's of dispersion experiments 4 different preparation times and 2 different vacuum release systems were tested. Again the viscosity was measured. The shear settings and pressures were about the same as in example 1. The results are set out in table 2 below. The viscosity numbers are based on averages from 3 to 5 experiments (except for trial B, which is based on a single experiment).

TABLE 2

Dispersion development data with different mixing times and vacuum break sequence.

| Trial | Total dispersion mix time | Dispersion method | Viscosity in the vacuum vessel after dispersion mix time (dPa · s) |
|---|---|---|---|
| A | 26 | 5-2 | 10.4 |
| B | 40 | 5-2 | 21 |
| C | 26 | 2-4 | 12.3 |
| D | 12 | 5-2 | 11.5 |
| E | 19 | 5-2 | 8 |

Example 3

45% fat spreads were successfully made using the dispersions from table 2, according to Trails A, B and C.

The spreads (i.e. oil-continuous emulsions) were made by the following process:

The water phase is prepared in a run tank by adding hot water in to the tank and adding the proper amount of salt, and adjusting the pH to about 3.9 with lactic acid. The water phase was cooled before entering the C-unit via a tubular heat exchanger (THE) to about 6-8° C.

In a 50 liter C-unit (operating at 500-900 rpm) the water phase and the fat dispersion of example 2 were mixed and turned into a spread.

The composition of the water phase was:

| Water phase | % on phase | % on product (45% fat) |
|---|---|---|
| Water | 97.0 | 53.35 |
| Salt | 3.0 | 1.65 |
| Lactic acid | 0.009 | 0.00495 |

Results:

Typical D3.3 and Stevens values of the 45% fat products obtained were:

| D3.3 (μm) | e^sigma | Stevens value (gram) |
|---|---|---|
| 5-7 | 1.5-2.0 | 5-7 |

Example 4

Four 30% fat spreads were made with the dispersions according to Trials D from table 2. The composition of the fat phase was as below

| Fat phase | % on fat phase | % on spread product (30% fat) |
|---|---|---|
| [1]Micronized fat powder | 12 | 3.6 |
| vegetable oil | 86.83 | 26.05 |
| [2]lecithin | 0.5 | 0.15 |
| Unsaturated Monoglyceride | 0.5 | 0.15 |
| Saturated Monoglyceride | 0.17 | 0.05 |

[1]The fat powder used is as was described for Example 1.
[2]Soybean lecithin.

The mixing of the fat powder and oil blend was conducted as described in example 1 trial 4, only for a total mixing time of 12 minutes.

Results:

Typically the D3.3 and Stevens values at processing of this 30% fat product were:

| D3.3 (μm) | e^sigma | Stevens value (gram) |
|---|---|---|
| 5-7 | 1.5-1.8 | 8-10 |

Overall Conclusions

Vacuum break is a tool to speed up the development of the dispersion and therefore reduce the mixing time.

The invention claimed is:

1. Process for preparing an edible fat slurry comprising 70-98% by weight (of the total slurry of oil and fat powder) of an edible oil and 2-30% by weight (of the total slurry of oil and fat powder) of fat powder, wherein the fat powder is a micronised fat powder of a structuring fat, said process comprising the steps of:
    a) providing the fat powder;
    b) providing the oil;
    c) combining the fat powder and the oil in a mixing vessel;
    d) mixing the oil and fat powder in the mixing vessel to a fat slurry for a period of 1 to 8 minutes at a pressure of below 0.25 bar;
    e) subjecting the mixing vessel to a pressurising step of 30 seconds to 6 minutes to raise the pressure in the mixing vessel to at least 0.3 bar, during which the shear in the mixing vessel is less than the shear in step g);
    f) subjecting the mixing vessel to a de-pressurising step of 1 to 10 minutes to reduce the pressure in the mixing vessel to below 0.25 bar; and
    g) subjecting the content of the mixing vessel to a stirring operation for 3 to 10 minutes;
    wherein the temperature of the fat powder, oil phase, and mixture thereof is kept at a temperature of below 35° C.

2. The process of claim 1, wherein the successive steps e) to g) are repeated at least once.

3. The process of claim 2, wherein the successive steps e) to g) are repeated until the viscosity of the content in the mixing vessel has reached a viscosity of at least 8 dPa·s.

4. The process of claim 1, wherein the pressure in steps d) and f) is reduced to below 0.2 bar.

5. The process of claim 1, wherein the de-pressurising step f) and the mixing step g) are effected in a total time of 2 to 10 minutes.

6. The process of claim 1, wherein after step g) the pressure is brought up to atmospheric pressure.

7. The process of claim 1, wherein the oil and the fat powder are mixed by one or more of (a) recirculation means, (b) a dynamic mixer, and (c) a stirrer in the mixing vessel.

8. The process of claim 7, wherein recirculation means comprises an in-line mixer.

9. The process of claim 8, wherein the stirring operation in step g) is carried out for at least the time equal to the average residence time in the vessel with recirculation means.

10. The process of claim 1, wherein the amount fat powder on the total fat slurry is from 2 to 20% by weight, based on the total fat slurry.

11. The process of claim 1, wherein the pressure at step e) is raised in the mixing vessel to from 0.3 to 0.7 bar.

12. The process of claim 5, wherein the de-pressurising step f) and the mixing step g) are effected in a total time of 3 to 8 minutes.

13. The process of claim 1, wherein the pressure in steps d) and f) is reduced to below 0.1 bar.

14. The process of claim 2, wherein the successive steps e) to g) are repeated until the viscosity of the content in the mixing vessel has reached a viscosity of at least 10 dPa·s.

15. A process for making an edible oil-continuous emulsion containing 15-80% (by weight of the total emulsion) of a fat phase and 20-85% (by weight of the total emulsion) of an aqueous phase, which process comprises the steps of
    a) providing the aqueous phase at a temperature below 35° C.,
    b) providing a fat slurry of oil and fat powder, c) mixing said aqueous phase and said fat slurry to obtain an oil-continuous emulsion, wherein said fat slurry is obtained by the process comprising the steps of claim 1.

* * * * *